United States Patent [19]
Barnes et al.

[11] 4,390,149
[45] Jun. 28, 1983

[54] BALLOON ENVELOPE AND METHOD OF FABRICATING SAME

[75] Inventors: Tracy L. Barnes; Christy A. Murphy, both of Statesville, N.C.

[73] Assignee: The Balloon Works, Inc., Statesville, N.C.

[21] Appl. No.: 258,615

[22] Filed: Apr. 29, 1981

[51] Int. Cl.³ .............................. B64B 1/40; B64B 1/58
[52] U.S. Cl. ...................................... 244/31; 244/126; 244/145
[58] Field of Search ..................... 244/31, 33, 126, 128, 244/133, 142, 145

[56] References Cited

U.S. PATENT DOCUMENTS

| | | | |
|---|---|---|---|
| 1,273,553 | 7/1918 | Upson | 244/145 |
| 1,849,965 | 3/1932 | Switlik | 244/145 |
| 2,795,830 | 6/1957 | Leatherman | |
| 2,858,090 | 10/1958 | Winzen et al. | 244/31 |
| 2,960,282 | 11/1960 | Winzen | 244/131 |
| 3,311,328 | 3/1967 | Slater | 244/31 |
| 3,369,774 | 2/1968 | Struble, Jr. | |
| 3,534,927 | 10/1970 | Harding | 244/145 |
| 3,744,191 | 7/1973 | Bird | |
| 4,113,206 | 9/1978 | Wheeler | |
| 4,117,993 | 10/1978 | Palm et al. | 244/145 |

FOREIGN PATENT DOCUMENTS

| | | |
|---|---|---|
| 216657 | 11/1909 | Fed. Rep. of Germany . |
| 337133 | 3/1921 | Fed. Rep. of Germany ...... 244/126 |
| 409323 | 2/1925 | Fed. Rep. of Germany . |
| 442537 | 4/1927 | Fed. Rep. of Germany . |

*Primary Examiner*—Galen L. Barefoot
*Attorney, Agent, or Firm*—W. Thad Adams

[57] ABSTRACT

A balloon envelope is disclosed which has the ability to minimize and isolate destructive tears, and which comprises a latticework of interconnected vertical and lateral reinforcing tapes which form open areas therebetween, and with a fabric panel overlying and covering each open area. The fabric panels are sewn to the surrounding tapes in a manner such that there is no direct interconnection between adjacent fabric panels. The envelope is fabricated by a procedure wherein the vertical gores, which are each composed of a vertical array of the fabric panels, are initially formed by sewing adjacent side edges of adjacent panels to intermediate laterally directed tapes, and then sewing a vertical tape component along each side of the resulting array of panels. The vertical side edges of the thus formed gores are then sewn together to form a sphere-like configuration.

9 Claims, 5 Drawing Figures

BALLOON ENVELOPE AND METHOD OF FABRICATING SAME

The present invention relates to an improved envelope for hot air sport balloons or the like, and which is characterized by the ability to limit and isolate destructive tears in the fabric panels of the envelope.

Present hot air sport balloons include a generally sphere-like envelope having an open mouth at the lower end, and certain models include an apex opening at the upper end. The apex opening is selectively covered and uncovered by a circular valve panel, which is controllable by the pilot to permit a controlled venting or deflation of the envelope. A carriage is mounted below the mouth of the envelope for supporting the pilot and other passengers, and a gas burner is mounted on the carriage for heating the air within the envelope.

The envelopes of present balloons typically are composed of a plurality of four sided fabric panels, which are interconnected to form a number of vertical gores which extend from the mouth to the apex opening. The gores are joined to laterally adjacent gores to complete the sphere-like structure. In joining the fabric panels to form the gores, and in joining the adjacent gores, it is conventional to directly join the adjacent components by means of a lap seam utilizing a two thread locking switch.

Since the fabric panels of such balloons must be very lightweight to be practical, the panels tear relatively easily, and damage is common from contact with trees or other objects upon landing. In this regard, it is also common for a tear in one fabric panel to continue across the lap seam to adjacent panels. As will be apparent, the resulting large openings are difficult and expensive to repair.

To alleviate the development of large tears in the envelope, present balloon manufacturers often sew heavy reinforcing tapes on top of the fabric, and sometimes on top of the seam lines. However, even with very heavy tapes, it has been found that tears often progress right across the seam and tape, much in the manner that a grid of masking tape on a single pane of glass will not prevent a break from continuing across the entire pane. Apparently, the only portion of the reinforcing tape which adds resistance to a progressive tear is the stitching which joins the reinforcing tape to the fabric panels, and such stitching is unable to isolate the tear.

It is accordingly an object of the present invention to provide a balloon envelope having the characteristic of minimizing and isolating damage to the fabric panels, and thereby facilitating repair and thus contributing to the safety of the sport of ballooning.

It is a further object of the present invention to provide a balloon envelope which effectively isolates damage to a single panel, and which permits a damaged panel to be readily and easily removed and replaced.

It is still another object of the present invention to provide an efficient method of fabricating a balloon envelope of the described type.

These and other objects and advantages of the present invention are achieved in the embodiment illustrated herein by the provision of an inflatable envelope for a hot air balloon or the like, and which comprises a latticework of interconnected tapes which collectively have a generally spherical configuration when expanded, and which define a plurality of open areas therebetween. A plurality of panels of a relatively lightweight, air impermeable sheet material are provided, with each panel covering respective ones of the open areas in the latticework. Each side of each panel is joined to the adjacent tape, with the adjacent sides of adjacent panels being free of any direct interconnection therebetween. Surprisingly, it has been found that the absence of a direct connection between the adjacent fabric panels results in a structural isolation which effectively prevents a tear in one panel from progressing into the adjacent panel. Thus any damage is effectively minimized and isolated, much as the sashes of a window separate and structurally isolate the small window panes from each other. Further, since the fabric panels are structurally isolated, each panel may be easily removed by cutting the seam lines on the surrounding tapes, and then replaced, all without disturbing the adjacent panels.

The above envelope is fabricated in accordance with the present invention by initially forming a plurality of vertical gores, with each gore being composed of an array of side by side panels sewn to intermediate tapes in the manner described above. Vertical tape components are then sewn along each side of the resulting array, and the thus formed gores are joined in a laterally side by side arrangement to form the desired sphere-like configuration, by sewing together the vertical tape components of adjacent gores.

Some of the objects and advantages of the invention having been stated, others will appear as the description proceeds, when taken in connection with the accompanying drawings, in which.

Figure 1:
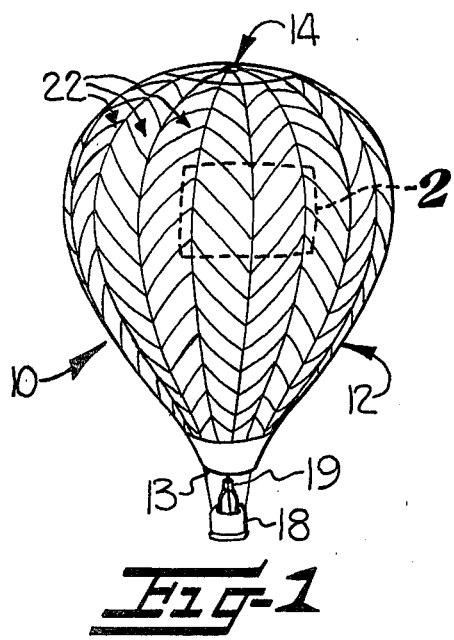
FIG. 1 is a perspective view of a hot air sport balloon embodying the features of the present invention.
Figure 4:
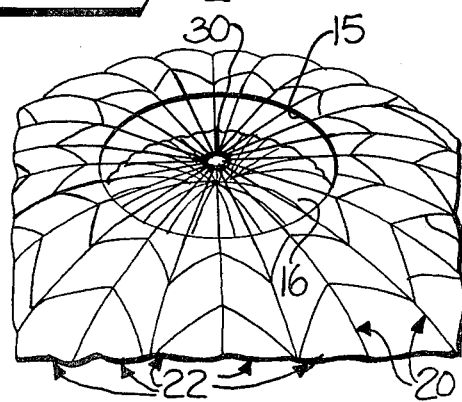
FIG. 4 is a fragmentary perspective view of the upper portion or apex of the balloon shown in FIG. 1.

Referring more specifically to the drawings, FIG. 1 illustrates generally at 10 a hot air sport balloon which embodies the present invention. The balloon includes an envelope 12 of generally spherical configuration when inflated, and the envelope includes an open mouth 13 at the lower end and an upper end or apex 14. Typically, such envelopes have a volume when inflated of between about 900 to 3000 cubic meters. As best seen in FIG. 4, a relatively large circular opening 15 is provided at the apex of the envelope, and a manually operable circular valve panel 16 is mounted within the envelope adjacent the opening 15 for selectively covering and uncovering the opening, and thus permitting controlled venting or deflation of the envelope by the pilot. A valve of this construction is presently known and utilized in the art.

The balloon 10 further includes a conventional carriage 18 mounted immediately below the mouth 13 of the envelope for supporting the pilot and passengers. In addition, the carriage 18 mounts a gas burner 19 or other heating means of conventional design for heating the air within the envelope, and thus causing the envelope to lift the entire balloon.

Figure 2:
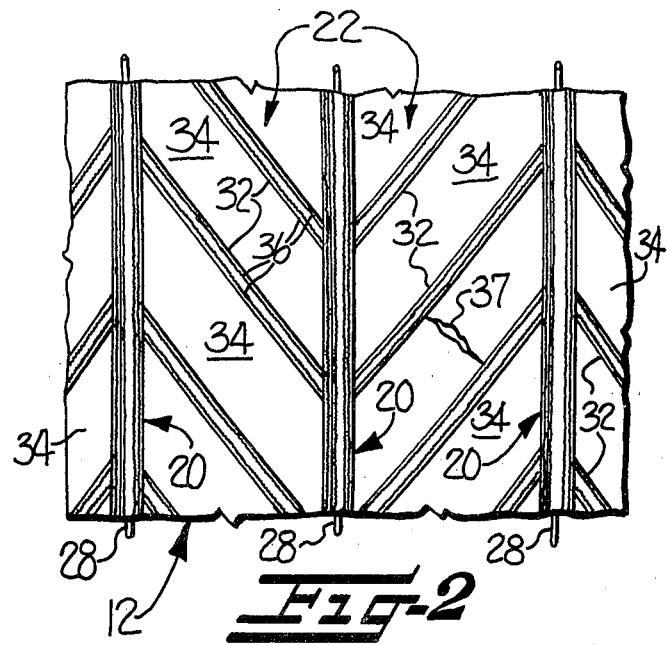
FIG. 2 is an enlarged view of the portion of the balloon envelope indicated at the area 2 in FIG. 1.
Figure 3:
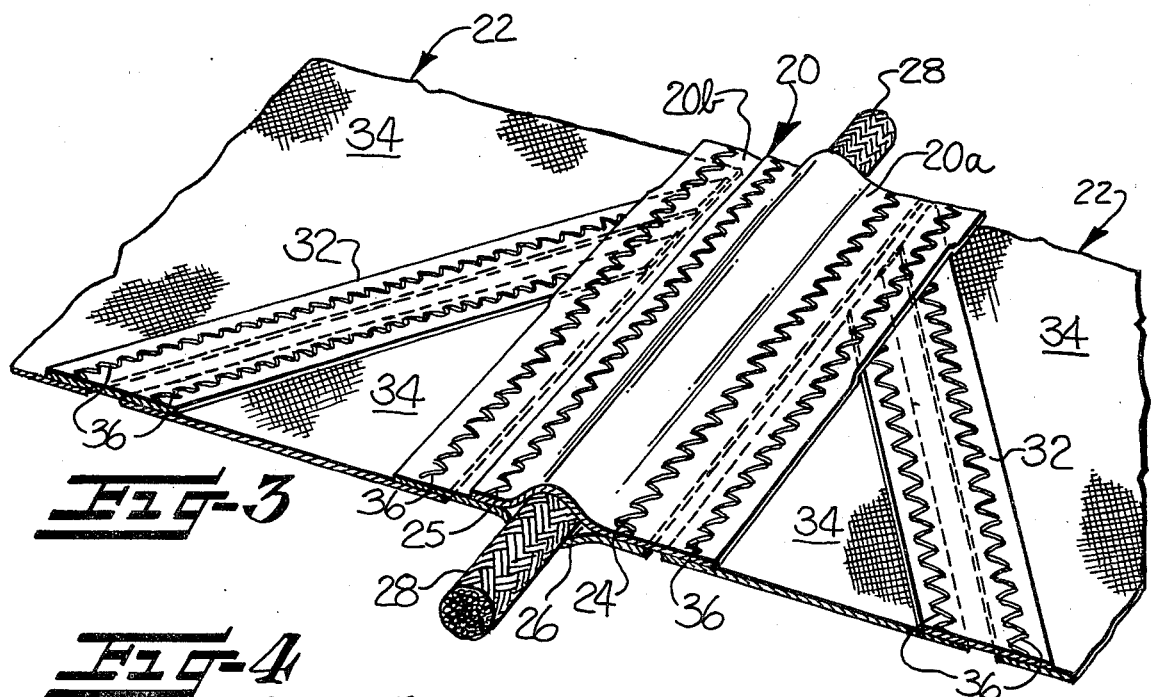
FIG. 3 is a perspective view of a portion of the envelope, and illustrating a portion of a vertical tape and load line, as well as the laterally directed tapes.

Referring to FIGS. 2 and 3, the envelope 12 further comprises a latticework of interconnected tapes which provides a structural framework for the entire balloon envelope. The tapes may be fabricated from any suitable woven fabric webbing or the like of relatively high strength, and they collectively have a generally spherical configuration when the envelope is expanded, and define a plurality of four sided openings therebetween.

The tape latticework includes a plurality of vertical tapes 20 which divide the envelope into a plurality of vertically disposed gores 22, each of which extends from the mouth 13 to the apex opening 15. The vertical tapes are each composed of a pair of two like tape components 20a, 20b, which have edge portions overlying each other in the manner as best seen in FIG. 3. The overlying portions are secured together by two spaced apart, parallel seams 24, 25, with each such seam preferably being composed of a two thread zigzag locking stitch (U.S. Std. No. 404). The two seams 24, 25 define a covered pocket 26 therebetween, and a load line 28 extends freely along the pocket and extends from the mouth 13 at the bottom of the envelope to the apex. More particularly, the lines 28 continue over the opening 15 and terminate at a small diameter steel tie ring 30 disposed in the center of the opening above the valve panel 16.

The tape latticework further includes a plurality of laterally directed tapes 32 in each gore 22, and which extend between the vertical tapes 20. The laterally directed tapes are substantially parallel to each other in each gore, and in the illustrated embodiment, the laterally directed tapes 32 extend in a non-perpendicular direction from the adjacent vertical tapes 20, and such that the open areas between the tapes have a generally rhomboid-like outline. Also, the laterally directed tapes 32 of adjacent gores extend in directions generally perpendicular to each other to improve the overall strength of the latticework and provide a pleasing appearance.

The envelope 12 further includes a plurality of panels 34 having four straight side edges, with the panels 34 composed of a relatively lightweight, air impermeable sheet material. Each of the open areas of the latticework of interconnected tapes is covered by one of the panels, and the panels are sewn to the adjacent tapes 20, 32 by continuous seams 36, with the adjacent sides of adjacent panels being free of any direct interconnection therebetween, note particularly FIG. 3. The panels 34 preferably comprise a woven polymeric fabric having a polymeric film coating, and the seams 36 are preferably composed of a two thread zigzag locking stitch as further identified above. Also, the sides of adjacent panels are preferably essentially spaced apart as seen in FIG. 3, and the continuous seams 36 provide a relatively air tight interconnection.

In fabricating the envelope 12, the panels 34 in a particular gore are first sequentially sewn to the laterally directed tapes 32, to form an array of side by side panels. A vertical tape component 20a and 20b is then sewn along the length of respective side edges of the array. The resulting gore 22 is thus itself a complete structural module which is bordered and crossed with the tapes. The assembly procedure is continued by partially overlapping the tape components 20a, 20b of the adjacent gores, and joining them with the two parallel, spaced apart seams 24 and 25. The seams 24, 25 form the protective covered pocket 26 into which the load line 28 may then be inserted.

The load lines 28 are secured to a girdle at the mouth 13, and to the ring 30 at the apex, and they are free to move within the pockets 26 to effectively distribute aerodynamic forces. After all of the gores 22 have been thus joined together, it will be seen that the entire surface of the envelope is girdled vertically at each gore seam by the vertical tapes 20, and circumferentially in a flexible zigzag pattern by the laterally directed tapes 32. This structural design provides a tough, flexible net which is an integral part of the balloon envelope, and in which damage to the fabric panels is minimized and isolated. Thus for example, as indicated at 37 in FIG. 2, a tear in one of the panels 34 will progress only to the adjacent tape, and will not progress into adjacent panels.

Figure 5:
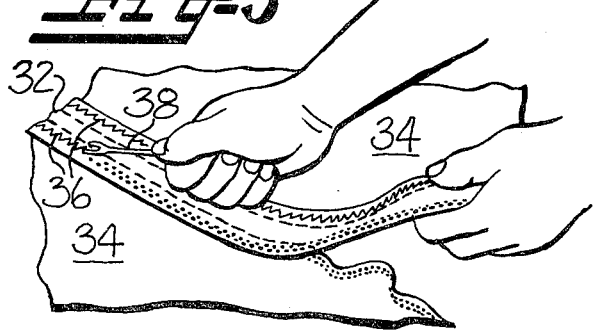
FIG. 5 is a fragmentary perspective view illustrating the manner in which a damaged panel may be removed from the supporting latticework of tapes in the envelope.

FIG. 5 illustrates the procedure by which a damaged panel 34 may be removed and replaced. In particular, the zig-zag lock stitched seams 36 can be easily removed with a seam ripper 38, to permit the damaged panel to be removed from its tape "frame" without disturbing the tape latticework or adjacent panels. A new panel can then be easily fitted and stitched into place utilizing a suitable zigzag sewing machine. For more extensive repairs, an entire gore 22 can be quickly and easily removed for repair utilizing the same technique as described above.

In the drawings and specification, there has been set forth a preferred embodiment of the invention, and although specific terms are employed, they are used in a generic and descriptive sense only and not for purposes of limitation.

That which is claimed is:

1. An inflatable envelope for a lighter than air balloon or the like, and characterized by the ability to limit distructive tearing thereof and comprising:

a latticework of interconnected tapes which collectively have a generally spherical configuration when extended, said latticework of tapes including a plurality of vertical tapes which divide the envelope into a plurality of vertically disposed gores, and a plurality of laterally directed tapes which extend between the vertical tapes within each gore, said plurality of vertical tapes and laterally directed tapes collectively defining a plurality of open areas therebetween, each of said vertical tapes being composed of a pair of like tape components having partially overlapping portions and adjacent non-overlapping portions, laterally spaced-apart seam means extending through said overlapping portion to interconnect the tape components and define a pocket therebetween and a load line extending freely through said pocket;

a plurality of panels of a relatively light weight, air impermeable sheet material, with each panel covering respective ones of said open areas, and, means joining each side of each panel to the non-overlapping portion of the adjacent tape component in a relatively airtight manner with the adjacent sides of adjacent panels being free of any direct interconnection between the adjacent panels and one of the pair of tape components whereby a tear developing in any one panel will terminate upon reaching an adjacent tape component without progressing into the adjacent panel and any torn panel can be removed and replaced without removing load line from its pocket.

2. The envelope as defined in claim 1 wherein said means joining each side of each panel to the adjacent tape includes a seam line composed of a two thread zigzag locking stitch.

3. The envelope as defined in claim 1 wherein said panels each comprise a woven polymeric fabric having a polymeric film coating.

4. The envelope as defined in claim 1 wherein said laterally directed tapes in each gore are substantially parallel to each other and extend in a non-perpendicular direction from the adjacent vertical tapes, and such that said open areas and panels have a generally rhomboid-like outline.

5. The envelope as defined in claim 4 wherein said laterally directed tapes in adjacent gores extend substantially perpendicular to each other.

6. A hot air sport balloon, characterized by the ability to limit and isolate distructive tearing of the envelope thereof, comprising:

an envelope of generally spherical configuration when inflated and having a open mouth at the lower end, and an apex at the upper end, said envelope comprising
  (a) a latticework of interconnected tapes which collectively have a generally spherical configuration when extended, said latticework of tapes including a plurality of vertical tapes which divide the envelope into a plurality of vertically disposed gores, and a plurality of latterally directed tapes which extend between the vertical tapes within each gore, said plurality of vertical tapes and latterally directed tapes collectively defining a plurality of open areas therebetween, each of said vertical tapes being composed of a pair of like tape components having partially overlapping portions and adjacent non-overlapping portions, laterally spaced-apart seam means extending through said overlapping portion to interconnect the tape components and define a pocket therebetween and a load line extending freely through said pocket;
  (b) a plurality of four-sided panels of a relatively light weight, air impermeable sheet material, with each panel covering respective ones of said open areas;
  (c) means joining each side of said panel to the non-overlapped portion of the adjacent tape component in a relatively airtight manner with the adjacent sides of adjacent panels being free of any direct interconnection between the adjacent panels and one of the pair of tape components;
a carriage mounted below the mouth of said envelope for supporting the pilot and passengers; and,
heating means mounted to said carriage for heating the air within the envelope.

7. The balloon as defined in claim 6 wherein each of said vertical tapes includes a covered pocket extending along its length, and said balloon further includes a load line freely extending along the length of each pocket.

8. The balloon as defined in claim 7 wherein said envelope further comprises a relatively large circular opening at said apex, and valve means manually operable from said carriage for selectively covering and uncovering said opening to thereby permit controlled venting or deflation of the envelope.

9. The balloon as defined in claim 8 wherein each of said load lines extends from said mouth to a tie ring disposed at said apex and centrally over said apex opening.

* * * * *